(12) United States Patent
Silvy et al.

(10) Patent No.: US 10,336,611 B2
(45) Date of Patent: Jul. 2, 2019

(54) SINGLE WALL CARBON NANOTUBE PURIFICATION PROCESS AND IMPROVED SINGLE WALL CARBON NANOTUBES

(71) Applicant: Technology Acquisition Group 2018, LLC, Lake Oswego, OR (US)

(72) Inventors: Ricardo Prada Silvy, Norman, OK (US); Yongqiang Tan, Norman, OK (US)

(73) Assignee: Technology Acquisition Group 2018, LLC, Lake Oswego, OR (US)

(*) Notice: Subject to any disclaimer, the term of this patent is extended or adjusted under 35 U.S.C. 154(b) by 34 days.

(21) Appl. No.: 15/337,262

(22) Filed: Oct. 28, 2016

(65) Prior Publication Data
US 2017/0050850 A1 Feb. 23, 2017

Related U.S. Application Data

(63) Continuation of application No. 14/342,735, filed as application No. PCT/US2012/052692 on Aug. 28, 2012, now abandoned.

(60) Provisional application No. 61/531,504, filed on Sep. 6, 2011.

(51) Int. Cl.
*C01B 32/159* (2017.01)
*C01B 32/178* (2017.01)
*B82Y 40/00* (2011.01)
*B82Y 30/00* (2011.01)
*C01B 32/17* (2017.01)

(52) U.S. Cl.
CPC .............. *B82Y 40/00* (2013.01); *B82Y 30/00* (2013.01); *C01B 32/17* (2017.08); *C01B 32/178* (2017.08); *C01B 2202/02* (2013.01); *C01B 2202/32* (2013.01); *Y10S 977/743* (2013.01); *Y10S 977/75* (2013.01); *Y10S 977/845* (2013.01); *Y10S 977/848* (2013.01); *Y10T 428/2982* (2015.01)

(58) Field of Classification Search
CPC ....... B82Y 30/00; B82Y 40/00; C01B 32/178; C01B 32/17; C01B 2202/32; C01B 2202/02; Y10S 977/743; Y10S 977/848; Y10S 977/75; Y10S 977/845; Y10T 428/2982
USPC ........ 423/447.1–447.3, 445 B; 977/742–754, 977/842–848
See application file for complete search history.

(56) References Cited

U.S. PATENT DOCUMENTS 5,346,683 A * 9/1994 Green .................... B82Y 30/00
                                                                        422/312
5,698,175 A * 12/1997 Hiura .................... B82Y 30/00
                                                                        423/445 B

OTHER PUBLICATIONS

Tsang, et al., Thinning and opening of carbon nanotubes by oxidation using carbon dioxide, Nature 1993; 362: 520-522 (Year: 1993).*

(Continued)

*Primary Examiner* — Daniel McCracken
(74) *Attorney, Agent, or Firm* — McAfee & Taft (57) ABSTRACT

Disclosed are methods for decapping single wall carbon nanotubes and purifying the decapped single wall carbon nanotubes. The disclosed methods include the steps of oxidizing the single wall carbon nanotubes to remove the terminal end cap and subsequently acid washing the single wall carbon nanotubes to remove the catalyst particles. The resulting carbon nanotubes have improved BET surface area and pore volume.

12 Claims, 8 Drawing Sheets

(56) References Cited

OTHER PUBLICATIONS

Ajayan, et al., Opening carbon nanotubes with oxygen and implications for filling, Nature 1993; 362: 522-525 (Year: 1993).*

* cited by examiner

SINGLE WALL CARBON NANOTUBE PURIFICATION PROCESS AND IMPROVED SINGLE WALL CARBON NANOTUBES

BACKGROUND

Methods for manufacturing single wall carbon nanotubes are now well known to those skilled in the art. See for example U.S. Pat. Nos. 6,333,016; 6,919,064; 6,962,892 and 7,459,138, the entirety of each identified patent being incorporated herein by reference.

Due to their structure, single wall carbon nanotubes have remarkable optical and electrical properties, high strength, as well as thermal and chemical stability. As a result, industry is continuously finding new uses for single wall carbon nanotubes including but not limited to printed electronic circuits and touch screen interfaces.

However, in order to achieve the full potential of this unique substance, the single wall carbon nanotubes must be provided in substantially pure condition. The typical manufacturing process for single wall carbon nanotubes relies upon metal catalysts supported on particles of alumina, magnesium oxide or silica or combinations thereof. Following growth and termination of the single wall carbon nanotube, the catalyst particle remains attached to the resulting nanotube structure. Removal of the metal component in a manner that does not damage or degrade the tube sidewall is desirable to provide a pure single wall carbon nanotube. Additionally, provision of a single wall carbon nanotube that is open on both ends of the tube is desirable to enhance the pore volume and surface area of the tube for certain applications, such as gas separation or water desalination membranes, super-capacitors, lithium ion batteries, etc.

SUMMARY

The present invention provides a method for purifying single wall carbon nanotubes. The method comprises the steps of passing an oxidizing gas into contact with catalyst material carrying single wall carbon nanotubes. The single wall carbon nanotubes have a terminal end cap closing the end of the tube opposite of the catalyst material. The method oxidizes the carbon atoms of the terminal end cap by passing the oxidizing gas into contact with the catalyst carrying the single wall carbon nanotubes for a period of time and at a temperature sufficient to oxidize the carbon atoms forming the terminal end cap without damaging the sidewalls of said single wall carbon nanotubes.

In another embodiment, the present invention provides a method for purifying single wall carbon nanotubes. The method initially fluidizes a bed of catalyst particles carrying single wall carbon nanotubes. The bed of single wall carbon nanotubes is housed within a reaction chamber and the nanotubes have a terminal end cap. The method adjusts the temperature of the reaction chamber to optimize oxidation of the terminal end cap of the single wall carbon nanotubes. The method oxidizes the carbon atoms of the terminal end cap by passing an oxidizing gas through the bed of catalyst particles carrying single wall carbon nanotubes at a flow rate sufficient to fluidize the bed. Flow of the oxidizing gas continues for a period of time and while maintaining the reaction chamber at a temperature sufficient to oxidize the carbon atoms forming the terminal end cap without damaging the sidewalls of the single wall carbon nanotubes. Thus, the oxidation step removes the end cap providing open-ended single wall carbon nanotubes on the catalyst particles.

Still further, the present invention provides a method for purifying single wall carbon nanotubes. The method comprises passing an inert gas through a bed of catalyst particles carrying single wall carbon nanotubes at a flow rate sufficient to fluidize the bed. The nanotubes have a terminal end cap and at least a portion of the catalyst particles have a deposit of amorphous carbon or graphitic carbon. The bed of catalyst particles to be fluidized is housed within a reaction chamber. Prior to conducting an oxidation step, the temperature of the reaction chamber is adjusted to a temperature suitable for oxidation of the carbon atoms forming the terminal end cap of the single wall carbon nanotubes. Subsequently, the passage of an oxidizing gas at a flow rate sufficient to fluidize the bed oxidizes the carbon atoms of the terminal end cap and the amorphous carbon or graphitic carbon of catalyst particles carrying single wall carbon nanotubes. The oxidation step does not damage, degrade or thin the sidewalls of the single wall carbon nanotubes. Thus, the method removes the end cap and provides an open-ended single wall carbon nanotube on the catalyst particle. Additionally, the method removes the amorphous carbon or graphitic carbon from the catalyst particles.

Additionally, the present invention provides purified single wall carbon nanotubes wherein the single wall carbon nanotubes have no more than 50% of the metal originally found on the catalyst particle used to prepare the single wall carbon nanotubes. More preferably the nanotubes will have no more than 30% of the metal originally found on the catalyst particle used to prepare the single wall carbon nanotubes. Still more preferably, the nanotubes will have no more than 28% of the metal originally found on the catalyst particle used to prepare the single wall carbon nanotubes.

Still further, the present invention provides single wall carbon nanotubes wherein both tube ends are unobstructed, i.e. open-ended. The single wall carbon nanotubes have a BET surface area between about 1088 $m^2/g$ and about 1416 $m^2/g$.

Still further, the present invention provides single wall carbon nanotubes wherein both tube ends are unobstructed. The single wall carbon nanotubes have a BET surface area between about 1088 $m^2/g$ and about 1416 $m^2/g$ and maximum HK pore volume at $P/P_0=0.30$ $cm^3/g$ of about 0.55 to about 0.71.

Still further, the present invention provides single wall carbon nanotubes wherein both tube ends are unobstructed. The single wall carbon nanotubes have a maximum HK pore volume at $P/P_0=0.30$ $cm^3/g$ of about 0.55 to about 0.71.

DETAILED DESCRIPTION

The present invention provides an improved single wall carbon nanotube purification method. The improved purification method also provides single wall carbon nanotubes having both ends open. Further, the purification process removes the terminal end cap of the single wall carbon nanotube without damaging the tube sidewalls. As used herein, the terminal capped end refers to the tube end having carbon atoms in a pentagon configuration opposite from the tube end carried by the catalyst particle. The resulting single wall carbon nanotubes have enhanced BET surface area and pore volume. Additionally, the resulting purified single wall carbon nanotubes have fewer sidewall defects and lower concentrations of metals derived from the catalyst particles used to manufacture the single wall carbon nanotubes.

The method of the current invention is particularly suited for use with single wall carbon nanotubes prepared in a fluidized bed reactor. However, the method will also be readily adaptable to single wall carbon nanotubes prepared by other catalytic processes.

The following discussion will focus on purification of a single wall carbon nanotubes prepared using a fluidized bed reactor housing a plurality of catalyst particles suitable for growing single wall carbon nanotubes. As used herein, the term catalyst particle refers to a support material such as, but not limited to, alumina, silica, magnesium oxide or mixtures thereof carrying catalytic metals suitable for manufacturing single wall carbon nanotubes. For example, one such suitable catalyst particle carries metallic cobalt and optionally includes $Mo_2C$ as a support for the metallic cobalt with the $Mo_2C$ supported by the previously indicated support material. The final catalyst particle (support plus catalytic material) typical ranges in size from about 100 microns to about 800 microns. Fluidized bed methods for preparing single wall carbon nanotubes utilizing such catalyst particles are well known to those skilled in the art and will not be discussed in detail herein. Rather, for further information concerning fluidized bed preparation of carbon nanotubes on catalyst particles see U.S. Pat. Nos. 7,459,138, and 7,816,709 incorporated herein by reference.

Figure 8:
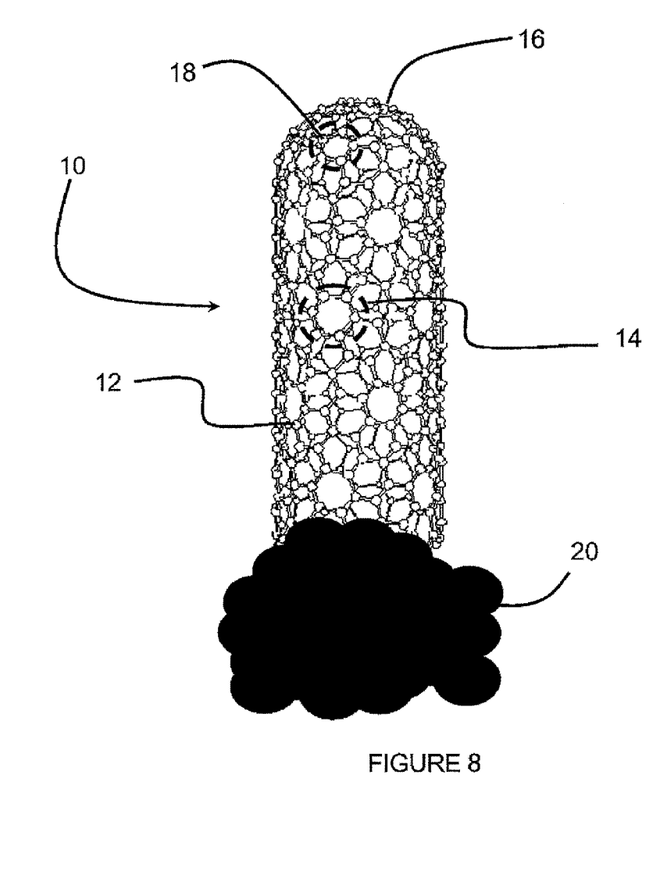
FIG. 8 provides an enlarged representation of a single wall carbon nanotube having a capped end with the single wall carbon nanotube carried by a catalyst particle.

In general, following placement of the catalyst particles in a reaction chamber, the reaction process for producing single wall carbon nanotubes requires flowing carbon monoxide through the bed of catalyst particles at a rate sufficient to fluidize the bed and a temperature sufficient to catalytically grow the single wall carbon nanotubes on the surface of the catalyst particles. As depicted in FIG. 8, the resulting single wall carbon nanotubes 10 have sidewalls 12 with carbon atoms arranged in a hexagon pattern 14 and a terminal capped end 16 with carbon atoms arranged in a pentagon pattern 18. The single wall carbon nanotube 10 in FIG. 8 is still carried by the catalyst particle 20. Thus both ends of the "as grown" single wall carbon nanotube 10 are closed. Although catalyst particle 20 is depicted as carrying only one single wall carbon nanotube 10, those skilled in the art will recognize that each particle 20 may carry a plurality of single wall carbon nanotubes 10.

After termination of single wall carbon nanotube growth on the catalyst particles, the method of the present invention begins by replacing the flow of carbon monoxide to the fluidized bed with a flowing inert gas. The inert gas passes through the reactor at a rate sufficient to maintain the catalyst particles carrying single wall carbon nanotubes in a fluidized condition. Additionally, depending on the average single wall carbon nanotube diameter, the inert gas will either heat or cool the reaction chamber to the desired temperature for oxidative treatment of the single wall carbon nanotubes and catalyst particles. In addition to use of the flowing gas to heat the reaction chamber, external devices such as heaters or fans may be used to increase or decrease reaction chamber temperature.

Although any gas inert to the catalyst particles and the single wall carbon nanotubes will suffice, the typical gases used for the temperature adjustment step will be selected from the group of nitrogen, argon and helium. In general, the flowing inert gas will adjust the temperature of the reaction chamber to a range between about 740° C. to about 900° C. More typically, the temperature of the reaction chamber will be adjusted to a temperature between about 760° C. and about 850° C. The final reaction chamber temperature will be tailored to optimize the following oxidation step based on the average single wall carbon nanotube diameter size within the reaction chamber. For example, if the catalyst material carries single wall carbon nanotubes having an average diameter size of 0.87 nm, then the oxidation of the single wall carbon nanotubes in the presence of $CO_2$ takes place at about 760° C. Larger diameters will generally require higher temperatures for the subsequent oxidation step and smaller diameter will generally require lower temperatures within the range described above.

To ensure even, consistent temperature adjustment, the flow rate of the inert gas will be sufficient to fluidize the bed of catalyst particles carrying single wall carbon nanotubes. One skilled in the art will recognize that the flow rate of the inert gas will be determined by the reactor design (particle sizes and density, reactor diameter and distributor plate design) as well as the mass of material loaded in the reaction chamber. In general, the upper flow rate is limited to preclude loss of material from the reaction chamber.

Following fluidization of the bed of catalyst particles carrying single wall carbon nanotubes and adjustment of the reaction chamber temperature to the desired oxidation temperature, the method changes the fluidization gas from the inert gas to an oxidation gas. Typically, the oxidation gas will be carbon dioxide. When using carbon dioxide as the oxidizing gas, the following reaction occurs at the terminal capped end of the single wall carbon nanotube.

$$C + CO_2 \rightarrow 2CO$$

Due to the higher stability of the aromatic ring structure hexagons of the sidewall carbon atoms, this reaction preferentially oxidizes carbon atoms of the pentagon structure formed at the terminal end of the single wall carbon nanotube. Additionally, any amorphous or graphitic carbon attached to the catalyst particle will be converted to carbon monoxide thereby exposing metal on the catalyst to the oxidation reaction. Further, removal of amorphous carbon from the catalyst particles precludes contamination of the production lot of single wall carbon nanotubes with free amorphous carbon released by acid digestion of the catalyst support.

Thus, the oxidation step yields a single wall carbon nanotube having an open terminal end with the other end of the tube attached to the catalyst particle used to original generate the carbon nanotube. Finally, $CO_2$ reaction oxidizes any graphite or amorphous carbon coating the catalytic particles exposing the supported metal which subsequently reacts with the oxidizing gas to produce surface metal oxide. This conversion of the catalytic components of the catalytic particles to an oxidized state, e.g. Co to $Co_3O_4$ and $Mo_2C$ to $MoO_3$, enhances the subsequent recovery of pure single wall carbon nanotubes by improving the solubility of the catalyst particle in acid.

In general, the oxidation step occurs at a flow rate sufficient to maintain the bed of catalyst particles carrying the single wall carbon nanotubes in a fluidized state. As discussed above, the fluidization flow rate will depend upon the dimensions of the reactor and the volume of particles in the reactor. For example, a flow rate of 15 liters per minute produced sufficient fluidization when using a reactor having a diameter of 3 inches and about 40 grams of catalyst, with 150-500 microns particles sizes carrying single walled carbon nanotubes with an average tube diameter of about 0.87 nm. To provide unreacted carbon dioxide to the upper limit of the fluidized bed, the liner velocity (velocity (u) measured in m/s) of the carbon dioxide must be between the minimum fluidization rate and the rate which will carry particles out of the reaction chamber (terminal velocity $u^*$ in m/s). Typically, the dimensionless linear velocity ratio ($u/u^*$) sufficient to provide unreacted carbon dioxide to the upper limit of the bed will range between 0.20 and 0.80. More commonly, the linear velocity ratio ($u/u^*$) will range between 0.40 and 0.70. As known to those skilled in the art, linear velocity takes into account reaction chamber dimensions, particle size, temperature and pressure.

Typically, the pressure of the carbon dioxide gas within the reaction chamber will be from one atmosphere to about 5.44 atmospheres. Further, as discussed above, the temperature of the oxidation step will depend upon the average size of the single wall carbon nanotubes within the reaction chamber. In general, the oxidation temperature may range from about 740° C. to about 900° C. More typically, the temperature of the reaction chamber will be adjusted to a temperature between about 760° C. and about 850° C. For example, if the catalyst particles carry single wall carbon nanotubes having an average diameter size of 0.87 nm, then the desired temperature for the oxidation step will be between about 760° C. and about 850° C. Larger diameters will generally require higher temperatures for the subsequent oxidation step and smaller diameters will generally require lower temperatures within the range described above.

Generally, the optimum oxidation temperature for single wall carbon nanotubes having average diameters between about 0.7 nm and 1.2 nm will typically be between about 740° C. and about 800° C. The optimum oxidation temperature for single wall carbon nanotubes with average diameters between about 1.2 nm and 1.8 nm will typically be between about 800° C. and 900° C. However, oxidation may be performed for all diameters of single wall carbon nanotubes at temperatures between about 740° C. and about 900° C. with the more common oxidation temperatures ranging from about 760° C. to about 850° C. for all diameter sizes.

Following completion of the oxidation step, the catalyst particles carrying the now decapped, i.e. open-ended single wall carbon nanotubes are removed from the reaction chamber and transferred to an acid wash. As noted above, the catalyst particles carrying the open-ended single wall carbon nanotubes are also substantially free of graphite and amorphous carbon. Additionally, a substantial portion of the catalytic metals on the catalyst particles have been converted to their oxidation compounds. The choice of acid for the acid bath step will be determined by the nature of the support component of the catalyst particle. If the support is alumina, then the acid may be selected from sulfuric acid, hydrochloric acid and hydrofluoric acid. If the support is magnesium oxide (MgO), then the acid will generally be hydrochloric acid. If the support is a silica, then the acid of choice will be hydrofluoric acid.

For economic and safety reasons, the acid bath uses the minimum amount of acid necessary to produce the desired dissolution of the catalyst particle and release of the single wall carbon nanotubes from the catalyst particle. In general, regardless of the type of acid used, the acid bath will have a ratio of catalyst particle and single wall carbon nanotubes (solid material) to acid of one kilogram of solid material to 20 liters of acid.

When using HF, the acid solution will range from 15% to 49% HF. More typically, the HF solution will be between 18% and 30% HF. Preferably, the HF acid solution will be 20% HF. When using either HCl or $H_2SO_4$, the acid solution will be about 3 molar to about 6 molar in concentration. The temperature of the acid bath will also depend upon the type of acid used to digest the catalyst particle. When using HF, the acid bath will be at room temperature. When using HCl or $H_2SO_4$, the acid solution will be between about 60° C. and about 80° C. Typically, the acid bath will be under atmospheric pressure. However, when using HCl or $H_2SO_4$, the acid wash may be operated under increased pressure. For example, use of an autoclave may permit operation at pressures up to about 500 psig.

The acid wash typically requires two to three hours to digest the catalyst particles and release the single wall carbon nanotubes. Agitation or stirring of the acid bath is typically used to ensure complete digestion of the catalyst particles. Upon completion of the acid wash, the single wall carbon nanotubes are neutralized by washing with deionized water until a pH of about 5 to about 7 is established in the suspension fluid (water) carrying the single wall carbon nanotubes. The resulting single wall carbon nanotubes, now open on both ends, are collected by filtration typically yielding a filter cake of single wall carbon nanotubes, also referred to below as a production lot of purified single wall carbon nanotubes. Subsequent processing of the single wall carbon nanotubes is determined by the intended application of the tubes. Such processing may include, but is not limited to, freeze-drying or dispersion of the tubes in a fluid.

The purified single wall carbon nanotubes prepared by the foregoing process are not only substantially free of the catalyst particle materials used to generate the tubes, the resulting single wall carbon nanotubes also have enhanced characteristics. In particular, the combination of the oxidation step and the acid washing step provides single wall carbon nanotubes have two open ends. Thus, the resulting single wall carbon nanotubes are hollow tubes substantially free of obstructions from one end to the other. Additionally, the single wall carbon nanotubes have increased BET surface area and increased pore volume.

Tables 1 and 2 below compare single wall carbon nanotubes purified by the method described above, to single wall carbon nanotubes prepared using identical catalyst particles but purified using only an HF acid wash for a period of 120 minutes. The catalyst used to prepare the single wall carbon nanotubes reported in the tables consisted of cobalt supported on $SiO_2$ wherein the cobalt was 0.5% by weight of the total catalyst particle. In the Tables, Sample 1 represents a control wherein the carbon nanotubes were prepared using the identified catalyst. However, the purification process for these single wall carbon nanotubes omitted the oxidation step relying solely on the acid washing step to isolate the single wall carbon nanotubes. As reflected in Table 1, for Sample 1, the HF acid wash did not remove any of the metallic cobalt. Rather, for Sample 1, the HF acid wash only digested the $SiO_2$ catalyst support material. Samples 2, 3 and 4 were prepared using the identified catalyst material and purified using the method discussed above; however, the temperature of the oxidation step was varied to demonstrate the impact of the temperature of oxidation. For Samples 2-4, the oxidation step used carbon dioxide at the indicated temperatures and flowing at a rate sufficient to fluidize the bed of 40 grams of catalyst particles carrying single wall carbon nanotubes. For samples 1-4, the acid wash step took place in hydrofluoric acid for a period of 120 minutes.

Table 1 demonstrates that oxidation of Sample 2 using carbon dioxide at 600° C., below the specified minimum of 740° C., produces only minimal benefit. In contrast, Samples 3 and 4 were oxidized using carbon dioxide under conditions of 800° C. and 850° C. respectively. As demonstrated by the Table 2, the oxidation step significantly increases the surface area of the resulting single wall carbon nanotube of Samples 3 and 4 when compared to single wall carbon nanotubes purified only by acid washing of Sample 1. Specifically, the single wall carbon nanotubes of Sample 3 had a 28% increase in BET surface and the single wall carbon nanotubes of Sample 4 had a 66% increase in BET surface area. Similarly, single wall carbon nanotubes of Samples 3 and 4 also realized a significant increase in pore volume. Sample 3 demonstrates a pore volume increase of 28% and Sample 4 demonstrates a pore volume increase of 65%.

TABLE 1

Effect of the de-capping conditions on the TGA residue

| Sample | Temperature of Oxidation with $CO_2$ | Expected Co residue (wt %) based on catalyst particle composition | TGA analysis (wt %) | Metallic Co Residue (wt %) | Metallic Co loss (%) |
| --- | --- | --- | --- | --- | --- |
| 1 | No Oxidation Step | 5.10 | 6.97 | 5.12 | 0 |
| 2 | 600° C. | 5.08 | 5.43 | 3.99 | 22% |
| 3 | 800° C. | 5.87 | 3.44 | 2.53 | 51% |
| 4 | 850° C. | 8.40 | 1.98 | 1.45 | 72% |

TABLE 2

BET Surface Area and Pore Volume

| Sample | BET Surface Area ($m^2/g$) | Maximum HK Pore Volume at $P/P_0 = 0.30$ $cm^3/g$ |
| --- | --- | --- |
| 1 | 852.8 | 0.43 |
| 3 | 1088.1 | 0.55 |
| 4 | 1416.5 | 0.71 |

Further, the combination of the oxidation step with the acid washing step significantly reduced the metal content of the single wall carbon nanotubes. As reflected in Table 1, Sample 4 after oxidation and acid wash contained 72% less metallic cobalt than the control sample. Stated in another manner, for Sample 4, the metal mass of the resulting purified single wall carbon nanotube corresponds to only 28% of the metal found on the original catalyst particle. Likewise, for Sample 3, the metal mass of the resulting purified single wall carbon nanotube corresponds to only 49% of the metal found on the original catalyst particle. Thus, the present invention provides production lots of purified single wall carbon nanotubes that contain no more than 50% and preferably, no more than 30% of the metal originally associated with the catalyst particle used to prepare the single wall carbon nanotubes. As used herein, the term production lot of purified single wall carbon nanotubes refers to a mass of single wall carbon nanotubes collected following the pH neutralization step described above.

Figure 1:
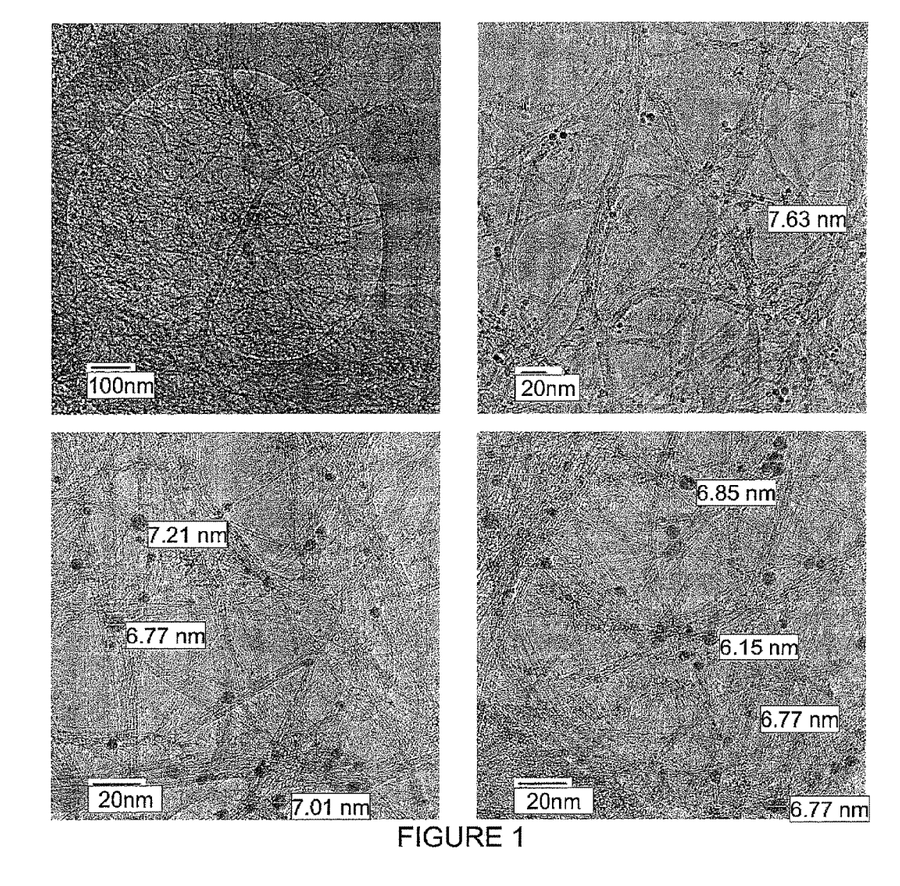
FIG. 1 depicts TEM images corresponding to conventional SWCNT having a capped terminal end showing the presence of metallic cobalt particles on non-oxidized single wall carbon nanotubes (Sample 1) following an acid wash purification step.
Figure 2:
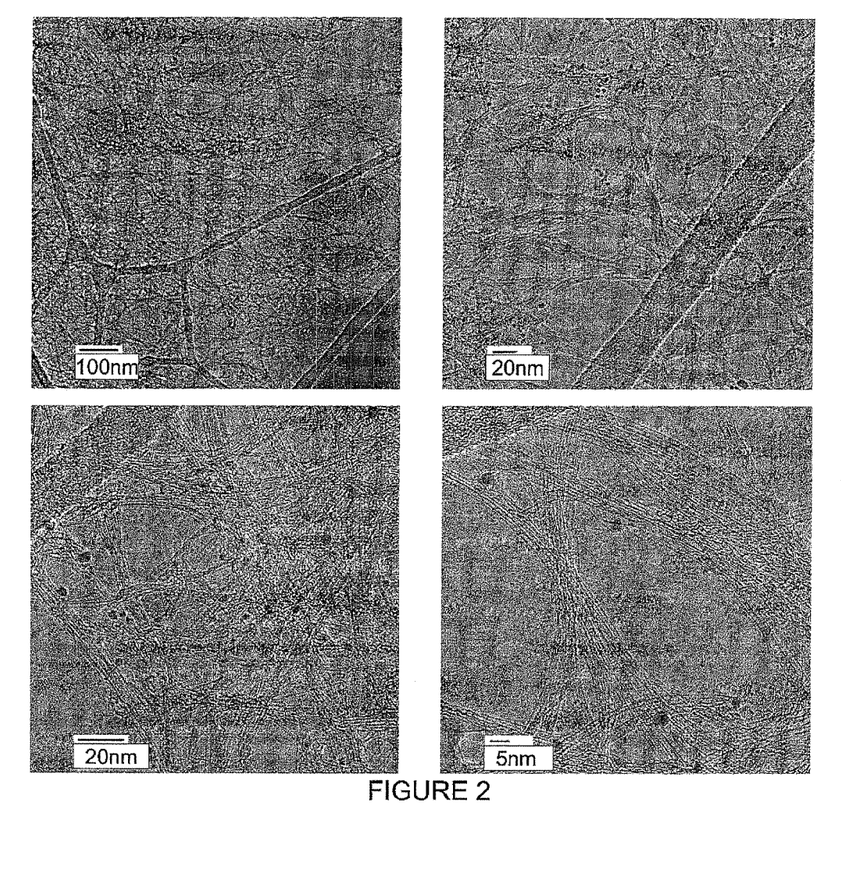
FIG. 2 depicts TEM images corresponding to SWCNT treated with $CO_2$ at 600° C. (Sample 2) showing similar metallic particle sizes observed in FIG. 1 followed by an acid wash.
Figure 3:
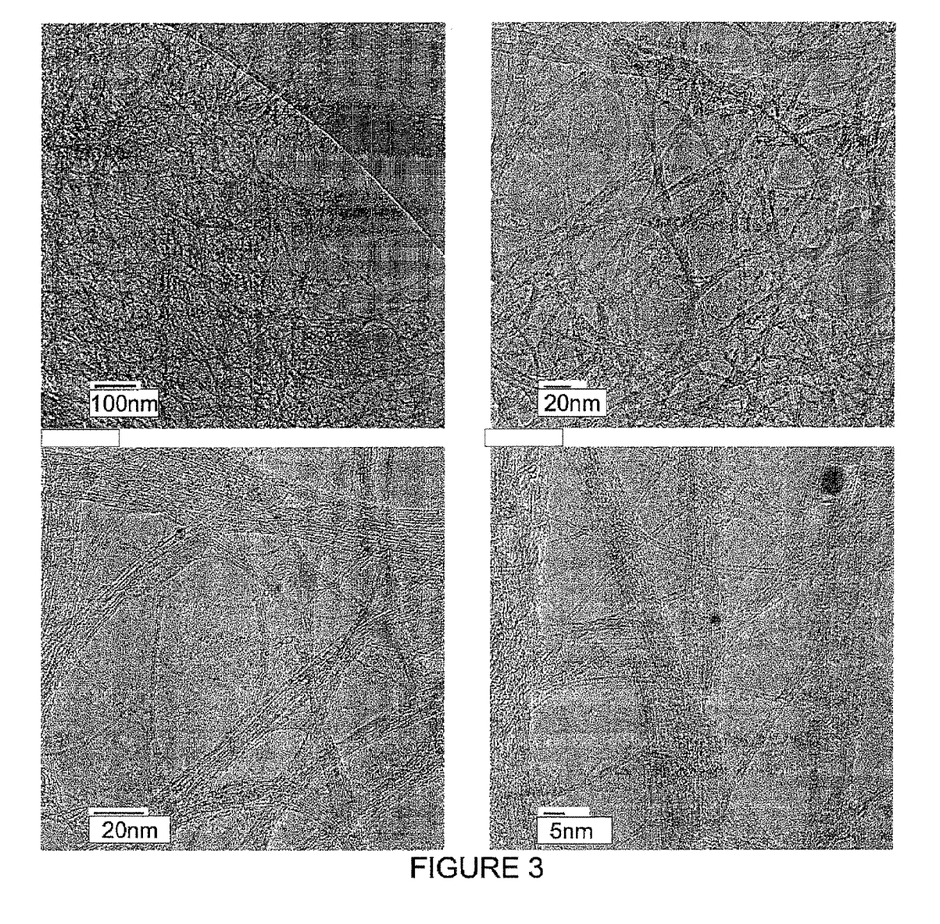
FIGS. 3 and 4 depict TEM images corresponding to the SWCNT treated with $CO_2$ at 800° C. and 850° C. showing the reduction in the density and size of metallic cobalt particles on single wall carbon nanotubes (Samples 3 and 4) prepared using the purification methods of the current invention.
Figure 4:
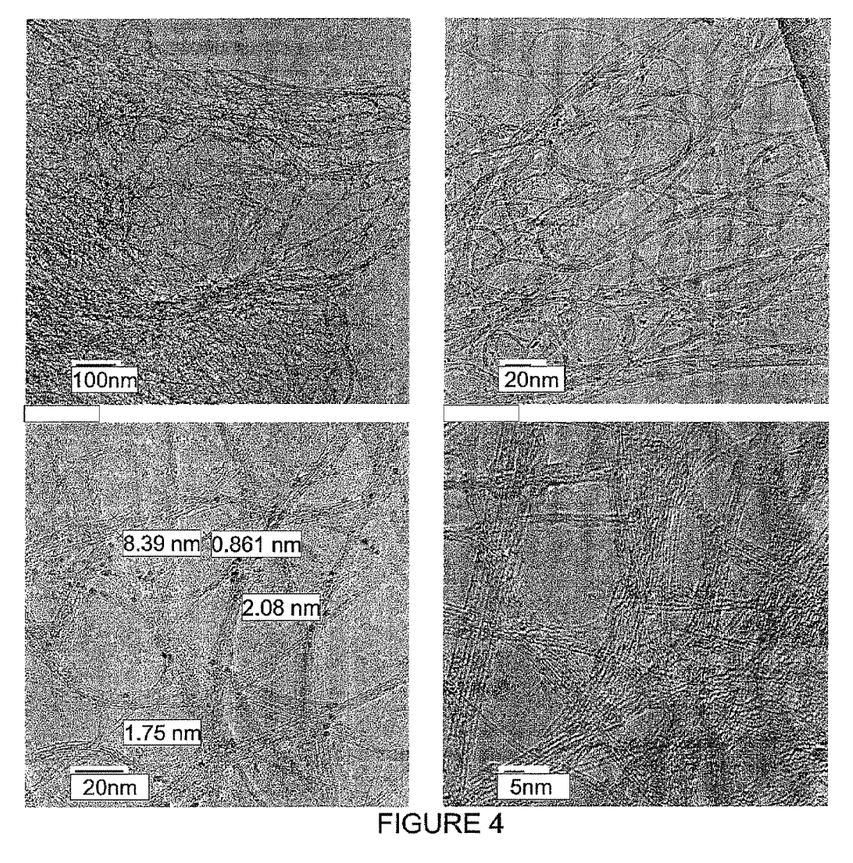

As a further benefit, the remaining metallic cobalt within the recovered single wall carbon nanotube bundle is significantly smaller in size than metallic cobalt associated with single wall carbon nanotubes prepared without the oxidation step. In FIG. 1, the dark generally round spots are metallic cobalt particles left behind in the bundle of single wall carbon nanotubes following the acid washing step for Sample 1. The average size of the metallic cobalt particles is about 5 nm with sizes ranging up to nearly 10 nm. In contrast, FIGS. 2 and 3 depict the cobalt particles associated with the single wall carbon nanotubes of Samples 2 and 3. As reflected by the FIGS., Samples 2 and 3 are mostly free of metal cobalt particles. Those particles present are generally smaller than those in Sample 1. Finally, FIG. 4 depicts the cobalt particles associated with the single wall carbon nanotubes of Sample 4. Consistent with the findings of Table 1, the amount of cobalt particles present in the bundle of Sample 4 has been significantly reduced. Further, the particle size of the remaining metallic cobalt particles is only between 1 to 3 nm.

Thus, the foregoing method for purifying single wall carbon nanotubes provides double decapped single wall carbon nanotubes, i.e. tubes open on each end, substantially free of impurities. Equally important, as demonstrated by the RAMAN spectra of FIG. 5, the diameter distribution tables of FIG. 6 and by the Optical Absorption spectra of FIG. 7, the purification process does not affect the optical properties, diameter distribution and quality of the resulting single wall carbon nanotubes.

Figure 5:
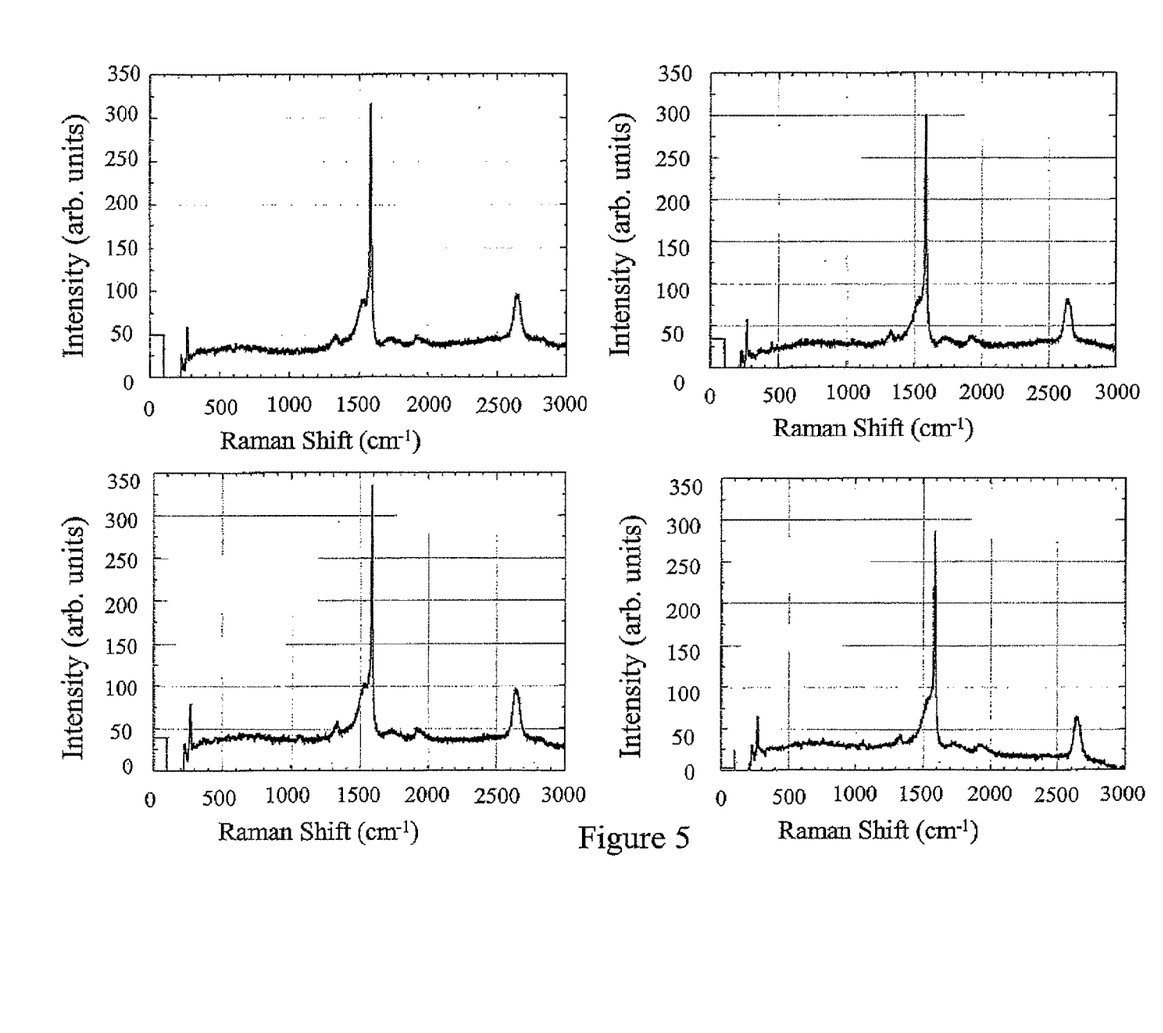
FIG. 5 provides Raman spectra for Samples 1-4 demonstrating that the $CO_2$ de-capping method of the present invention does not degrade the quality of the resulting single wall carbon nanotubes.
Figure 6:
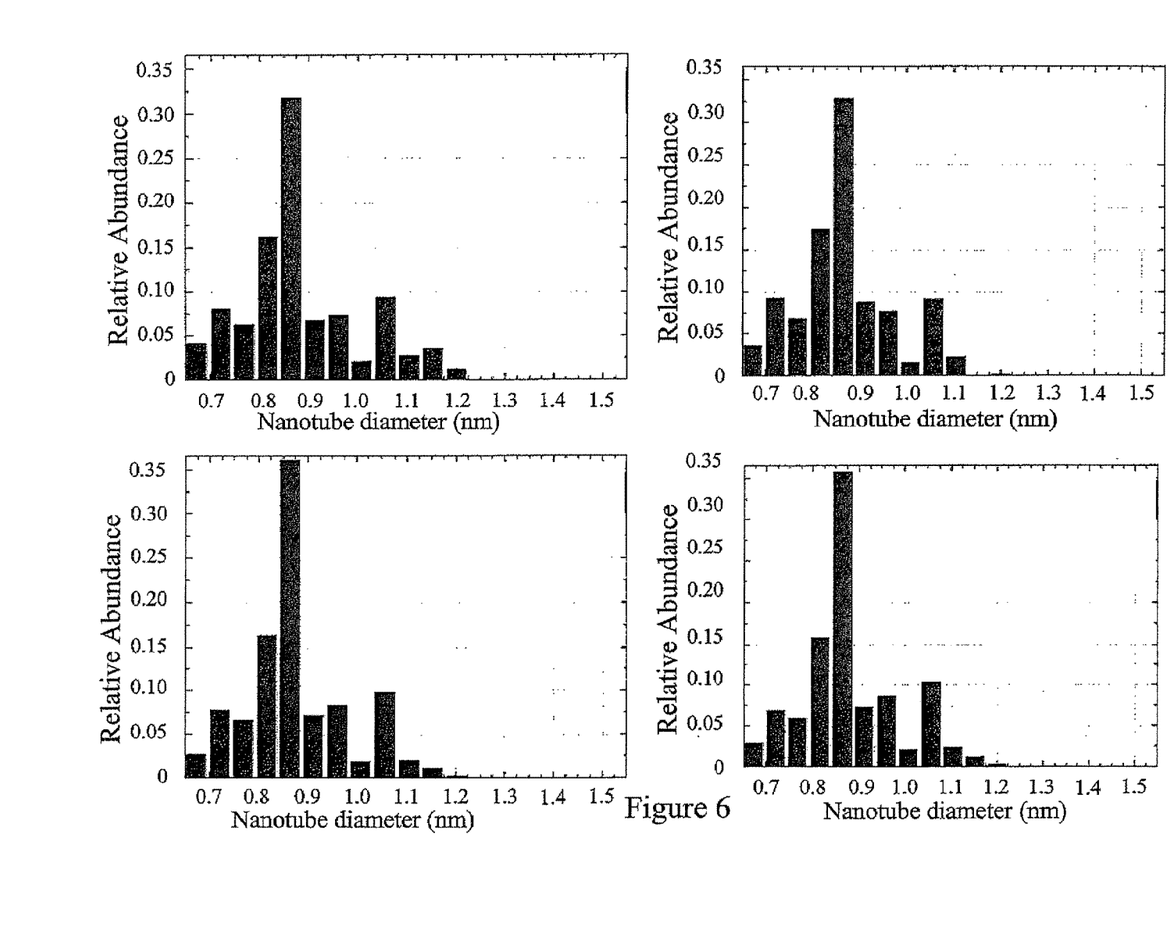
FIG. 6 provides a Fluorescence Analysis for Samples 1-4 showing that the SWCNT diameter distribution was not affected by the $CO_2$ de-capping method.
Figure 7:
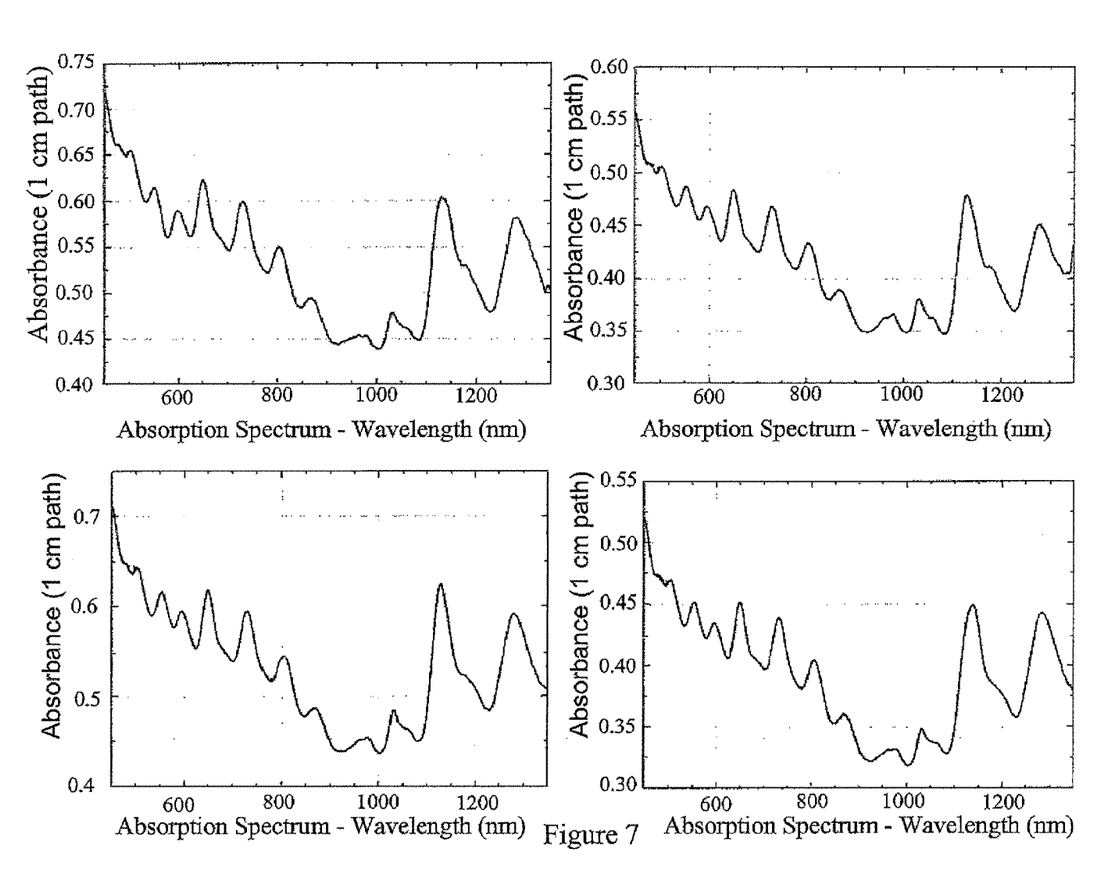
FIG. 7 provides an Optical Absorption Analysis for the samples 1-4 showing that the SWCNT chirality distribution was not affected by the $CO_2$ de-capping method.

The RAMAN spectra of FIG. 5 and the Fluorescence Analysis of nanotube diameters reported in FIG. 7, correspond as indicated to Samples 1-4 discussed above. Thus, the oxidation step of the current invention does not attack or thin the sidewalls of the single wall carbon nanotubes. Rather, the oxidation step removes the terminal end cap of the single wall carbon nanotube and the amorphous or graphitic carbon carried by the catalyst particles.

Other embodiments of the present invention will be apparent to one skilled in the art. As such, the foregoing description merely enables and describes the general uses and methods of the present invention. Accordingly, the following claims define the true scope of the present invention.

What is claimed is:

1. A method for purifying single wall carbon nanotubes comprising:
   passing an oxidizing gas into contact with catalyst material carrying single wall carbon nanotubes, said single wall carbon nanotubes having a terminal end cap; and,
   oxidizing the carbon atoms of said terminal end cap by continuing to pass said oxidizing gas into contact with the catalyst carrying the single wall carbon nanotubes for a period of time and at a temperature sufficient to oxidize the carbon atoms forming the terminal end cap without damaging the sidewalls of said single wall carbon nanotubes.

2. A method for purifying single wall carbon nanotubes comprising:

fluidizing a bed of catalyst particles carrying single wall carbon nanotubes, said nanotubes having a terminal end cap and said bed of catalyst particles housed within a reaction chamber;

adjusting the temperature of the reaction chamber to optimize oxidation of the carbon atoms forming the terminal end cap of the single wall carbon nanotubes;

oxidizing the carbon atoms of said terminal end cap by passing an oxidizing gas through the bed of catalyst particles carrying single wall carbon nanotubes at a flow rate sufficient to fluidize said bed of catalyst particles carrying single wall carbon nanotubes for a period of time and sufficient to oxidize the carbon atoms forming the terminal end cap without damaging the sidewalls of said single wall carbon nanotubes thereby removing said end cap and providing an open-ended single wall carbon nanotube on said catalyst particles.

3. A method for purifying single wall carbon nanotubes comprising:

passing an inert gas through a bed of catalyst particles carrying single wall carbon nanotubes at a flow rate sufficient to fluidize said bed, said nanotubes having a terminal end cap and said bed of catalyst particles housed within a reaction chamber;

adjusting the temperature of the reaction chamber to a temperature suitable for oxidation of the carbon atoms forming the terminal end cap of the single wall carbon nanotubes;

oxidizing the carbon atoms of said terminal end cap by passing an oxidizing gas through the bed of catalyst particles carrying single wall carbon nanotubes at a flow rate sufficient to fluidize said bed of catalyst particles carrying single wall carbon nanotubes for a period of time sufficient to oxidize the carbon atoms forming the terminal end cap without damaging the sidewalls of said single wall carbon nanotubes thereby removing said end cap and providing an open-ended single wall carbon nanotube on said catalyst particles.

4. A method for purifying single wall carbon nanotubes comprising:

passing an inert gas through a bed of catalyst particles carrying single wall carbon nanotubes at a flow rate sufficient to fluidize said bed, said nanotubes having a terminal end cap and at least a portion of said catalyst particles having a deposit of amorphous carbon or graphitic carbon and said bed of catalyst particles housed within a reaction chamber;

adjusting the temperature of the reaction chamber to a temperature suitable for oxidation of the carbon atoms forming the terminal end cap of the single wall carbon nanotubes;

oxidizing the carbon atoms of said terminal end cap and said amorphous carbon or graphitic carbon by passing an oxidizing gas through the bed of catalyst particles carrying single wall carbon nanotubes at a flow rate sufficient to fluidize said bed of catalyst particles carrying single wall carbon nanotubes for a period of time sufficient to oxidize the carbon atoms forming the terminal end cap without damaging the sidewalls of said single wall carbon nanotubes thereby removing said end cap and providing an open-ended single wall carbon nanotube and thereby removing said amorphous carbon or graphitic carbon from said catalyst particles.

5. The method as in one of claims 1-4, wherein said oxidizing gas is selected from the group consisting of carbon dioxide, nitrous oxides, sulfur oxides and mixtures thereof.

6. The method as in one of claims 2-4, further comprising the step of subjecting said catalyst particles carrying single wall carbon nanotubes to an acid wash thereby removing said catalyst particles from said carbon nanotubes.

7. The method of claims 6, wherein said acid is selected from the group consisting of hydrofluoric acid, sulfuric acid, hydrochloric acid and a mixture of sulfuric acid and hydrochloric acid.

8. The method of claim 6, wherein the ratio of solid material to acid is one kilogram of solid material to 20 liters of acid.

9. The method as in one of claims 2-4, wherein said reaction chamber is maintained at a temperature between about 740° C. and about 900° C. during the step of oxidizing the carbon atoms of said terminal end cap.

10. The method as in one of claims 2-4, wherein said reaction chamber is maintained at a temperature between about 760° C. and about 850° C. during the step of oxidizing the carbon atoms of said terminal end cap.

11. The method as in one of claims 2-4, further comprising the step of determining the average diameter of carbon nanotubes within said reaction chamber and adjusting the reaction chamber to a temperature between about 740° C. and about 800° C. during the step of oxidizing the carbon atoms of said terminal end cap when said average diameter of said single wall carbon nanotubes is between 0.7 nm and 1.2 nm.

12. The method as in one of claims 2-4, further comprising the step of determining the average diameter of carbon nanotubes within said reaction chamber and adjusting the reaction chamber to a temperature between about 800° C. and about 900° C. during the step of oxidizing the carbon atoms of said terminal end cap when said average diameter of said single wall carbon nanotubes is between 1.2 nm and 1.8 nm.

* * * * *